United States Patent
Garvey

(10) Patent No.: US 6,705,684 B1
(45) Date of Patent: Mar. 16, 2004

(54) TRAILER BRAKE CONTROL SYSTEM WITH SAFETY FUNCTION

(76) Inventor: Vincent Roy Garvey, 99 Stratton Heights, Stratton, Cirencester (GB), GL7 2RW (*) Notice: Subject to any disclaimer, the term of this patent is extended or adjusted under 35 U.S.C. 154(b) by 0 days.

(21) Appl. No.: 10/069,324

(22) PCT Filed: Aug. 21, 2000

(86) PCT No.: PCT/GB00/03237
§ 371 (c)(1),
(2), (4) Date: Feb. 20, 2002

(87) PCT Pub. No.: WO01/14188
PCT Pub. Date: Mar. 1, 2001

(30) Foreign Application Priority Data

Aug. 20, 1999 (GB) .............................................. 9919629

(51) Int. Cl.$^7$ .................................................. B60T 7/20
(52) U.S. Cl. ........................... 303/123; 303/7; 303/124; 188/112 A
(58) Field of Search ................. 303/7, 123, 124; 188/112 A, 112 R, 3 R

(56) References Cited

U.S. PATENT DOCUMENTS

| | | | | |
|---|---|---|---|---|
| 2,856,036 A | * | 10/1958 | Mullen | 188/112 R |
| 3,566,987 A | * | 3/1971 | Franzel | 188/112 A |
| 3,709,565 A | * | 1/1973 | Joanson et al. | 303/182 |
| 3,819,234 A | * | 6/1974 | Couchois et al. | 303/20 |
| 3,893,692 A | * | 7/1975 | Presley et al. | 303/7 |
| 3,908,782 A | * | 9/1975 | Lang et al. | 188/112 A |
| 3,909,044 A | * | 9/1975 | Henzel et al. | 280/432 |
| 3,948,567 A | * | 4/1976 | Kasselmann et al. | 303/7 |
| 3,955,652 A | * | 5/1976 | Nilsson et al. | 188/112 R |
| 3,972,543 A | * | 8/1976 | Presley et al. | 280/455.1 |
| 3,993,362 A | * | 11/1976 | Kamins et al. | 303/146 |
| 4,023,863 A | * | 5/1977 | Sisson et al. | 303/7 |
| 4,023,864 A | * | 5/1977 | Lang et al. | 303/20 |
| RE33,697 E | * | 9/1991 | McNinch | 303/7 |
| 5,149,121 A | * | 9/1992 | Hafner | 280/432 |
| 5,482,359 A | * | 1/1996 | Breen | 303/9.69 |
| 6,012,780 A | * | 1/2000 | Duvernay | 303/7 |
| 6,042,196 A | * | 3/2000 | Nakamura et al. | 303/7 |
| 6,280,004 B1 | * | 8/2001 | Greaves, Jr. | 303/20 |

FOREIGN PATENT DOCUMENTS

| | | |
|---|---|---|
| GB | 1 497 179 | 11/1975 |
| GB | 2 322 918 A | 9/1998 |
| WO | 98/38068 | 9/1998 |

* cited by examiner

*Primary Examiner*—Jack Lavinder
*Assistant Examiner*—Devon Kramer
(74) *Attorney, Agent, or Firm*—Pedersen & Co, PLLC; Ken J. Pedersen; Barbara S. Pedersen

(57) ABSTRACT

A tow ball (14) is mounted to a bracket (16) by means of a spacer (20) which incorporates transducers (24) to provide signals indicating forces existing between the towing vehicle and the trailer. A control system is described which is operable to apply braking to the trailer to modify the trailer behavior independently of operation of the vehicle brakes by the operator.

22 Claims, 3 Drawing Sheets

TRAILER BRAKE CONTROL SYSTEM WITH SAFETY FUNCTION

The present invention relates to trailer safety and in particular, to the safety of trailers towed behind road vehicles.

In this document, the term "trailer" will be used to encompass caravans, trailers and other like arrangements. When towing a trailer on the road, particularly behind a private vehicle, it is common to use a single point towing hitch, commonly known as a tow ball. This arrangement provides safe control over the trailer when the towing vehicle is accelerating, so that positive forces are being applied to the trailer through the hitch. However, when the towing vehicle stops accelerating, the trailer is no longer stabilised in this manner and can begin to sway dangerously, particularly when the towing vehicle decelerates.

Systems are known which determine lateral sway or acceleration of a vehicle during cornering and then selectively apply braking to control that sway. An example of such a system is given in U.S. Pat. No. 4,023,864 (Lang et al). Unfortunately, lateral sway is only one form of vehicle instability and may not be a significant factor with vehicle stability when travelling in a straight line. Furthermore, it would be desirable to detect and prevent vehicle instability before there is lateral sway.

The present invention provides a trailer control system comprising sensor means operable to measure forces between the towing vehicle and the trailer, control means operable while the vehicle is in operation and in response to the measurements to assess the behaviour of the trailer relative to the towing vehicle, the control means being further operable to apply braking to the trailer to modify the trailer behaviour independently of operation of the vehicle brakes by the operator whereby at least load axially applied to the vehicle by the trailer is continuously assessed, and the control means thereby applies braking to substantially ensure that the load remains positive.

Preferably the system calculates whether or not towing forces are being applied to the trailer. The trailer may be operable to apply braking if towing forces are not being applied. Braking may be applied until towing forces are restored. Braking is preferably enabled and disabled in pulsed manner until towing forces are restored.

The sensor means may provide information enabling the system to detect the alignment of the trailer behind the towing vehicle. The system may be operable to apply braking selectively to one side of the trailer or the other to correct misalignment. The sensor means may provide information enabling the system to sense the vehicle turning. Preferably the system refrains from applying braking to the trailer while the vehicle is turning.

The sensor means are preferably arranged to sense forces in the mounting arrangement by which the trailer hitch point is mounted on the towing vehicle. The sensor means may comprise a spacer member which, in use, is entrapped between the towing vehicle and the trailer hitch point, and transducer means operable to detect forces within the spacer member. The transducer means may comprise strain gauges, which are preferably under compression when the system is at rest. The transducer means may comprise a plurality of transducers distributed around the spacer member. The system may further comprise accelerometer means operable to measure acceleration of the towing vehicle and/or trailer. Preferably the accelerometer means measure acceleration of the towing vehicle, and derive the acceleration of the trailer from the measured acceleration and from the force measurements of the sensor means.

The system may further comprise actuator means operable to apply control forces to a brake cable of the trailer. The actuator means may comprise at least one stepper motor. The actuator means may be operable to apply control forces independently to individual brake cables.

Examples of the present invention will now be described in more detail, by way of example only, and with reference to the accompanying drawings, in which.

Figure 1:
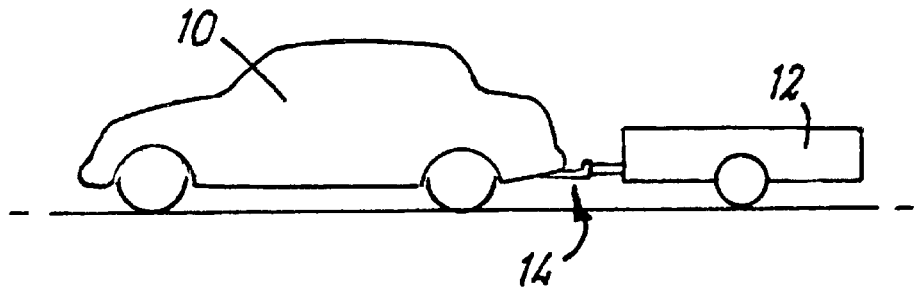
FIG. 1 is a schematic elevation of a vehicle and trailer arrangement of the type with which the invention may be used.

FIG. 1 shows a towing vehicle 10 towing a trailer 12 connected to the vehicle 10 at a tow ball 14.

Figure 2:
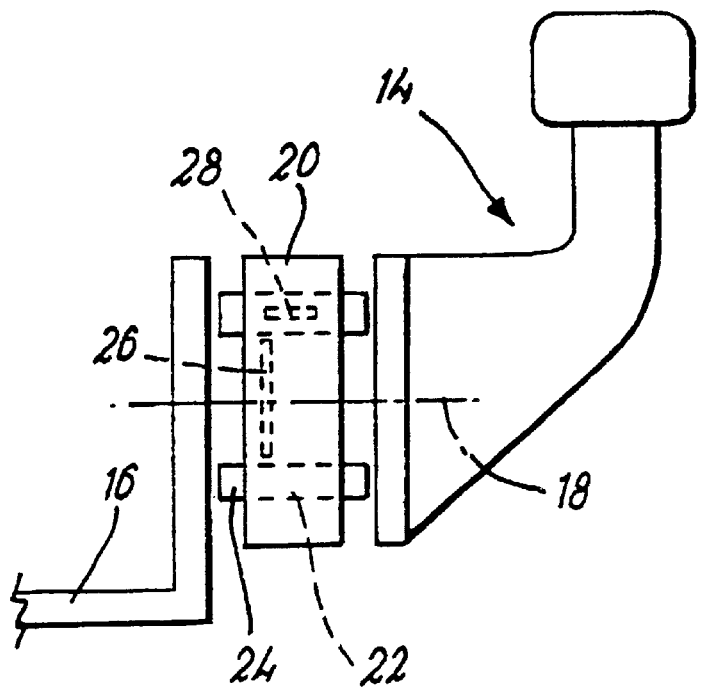
FIG. 2 shows the tow ball of FIG. 1 in more detail.

FIG. 2 shows the tow ball arrangement in more detail (with the trailer 12 unhitched). A mounting bracket 16 is carried by the rear of the vehicle and provides a mounting for the tow ball 14, by means of fixing bolts (not shown) centred at the lines 18 and positioned one to either side of the tow ball 14. A spacer member 20 is interposed between the tow ball 14 and mounting bracket 16.

Figure 3:
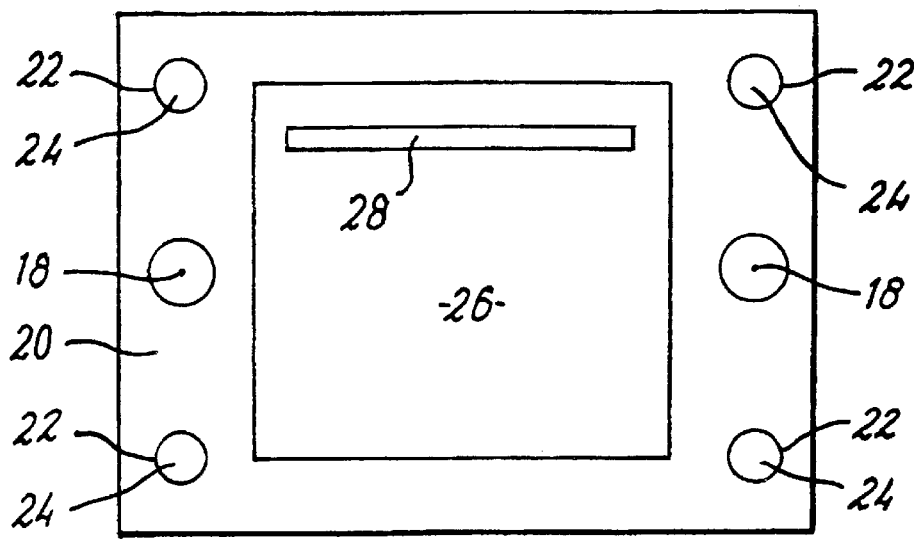
FIG. 3 is a section through the tow ball of FIG. 2, along the line 3—3 in FIG. 2.

The spacer member and associated components can be described in more detail by reference also to FIG. 3. The spacer member 20 consists of a relatively thin block of material, such as aluminium, having the same general outline as the face of the tow ball 14 offered to the mounting bracket 16, which in this example is rectangular. Two apertures 22 are provided for receiving mounting bolts extending between the tow ball 14 and mounting bracket 16, which additionally serve to locate the spacer member 20. Four transducers 24 are provided in the region of the corners of the spacer member 20. A central region of the spacer member 20 carries a printed circuit board 26 and an attitude sensing arrangement to be described below.

Each transducer 24 is a strain gauge or series of strain gauges which project through both faces of the spacer member 20, as can be seen in FIG. 2, so that when the tow ball 14 is mounted on the bracket 16, the mounting bolts may be tightened to pre-load the transducer 24 by compression between the ball 14 and bracket 16. This pre-loading ensures that the transducers 24 can provide signals representing forces in the forward or rearward direction.

Figure 4:
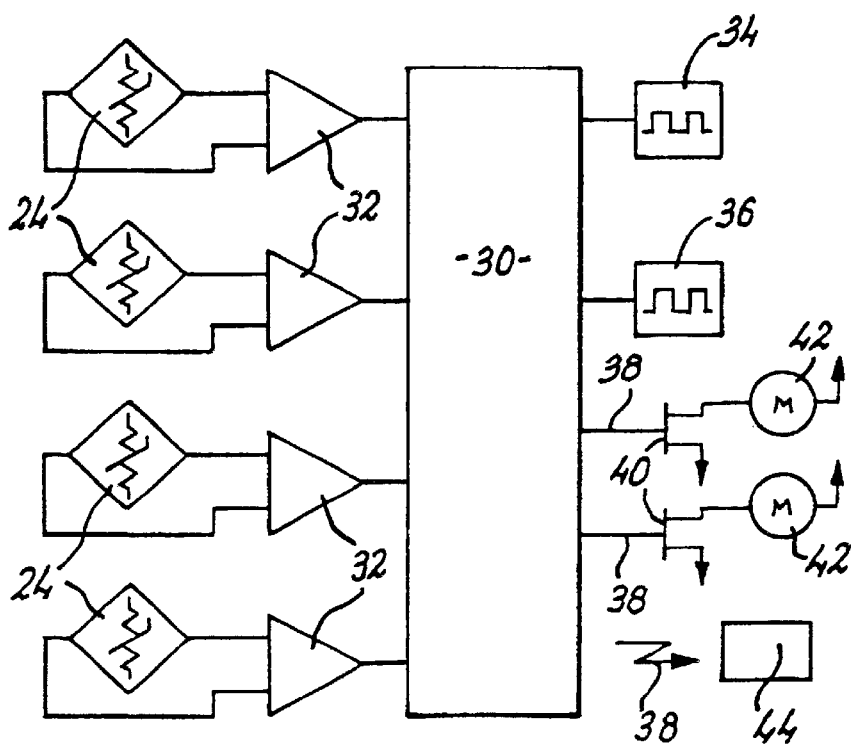
FIG. 4 is a block schematic of the electrical circuits associated with the tow ball arrangement of FIGS. 2 and 3.

The transducers 24 form part of an electronic circuit arrangement illustrated in simple block diagram form in FIG. 4. The arrangement of FIG. 4 is implemented primarily by means of a microprocessor based circuit 30 located on the circuit board 26 and accompanied by appropriate support circuits such as power supplies, memory and the like (not shown separately in FIG. 4). Each of the transducers 24 provides an input to the microprocessor 30, as follows. The strain gauge of the transducer 24 acts as a variable resistance in a Wheatstone bridge arrangement, the output of which is applied through a gate 32 to an input of the microprocessor 30. The microprocessor 30 can, in this manner, receive a signal indicating the force instantaneously experienced by the transducer 24, which can be either in the positive or negative sense, by virtue of the preloading. Each of the four transducers 24 provides an input to the microprocessor 30 in this manner.

Two further inputs to the microprocessor 30 are from the attitude sensing arrangement 28, which incorporates an elevation sensor 34 and an azimuth sensor 36.

The microprocessor 30 provides three outputs, as follows. Two outputs 38 are applied to a gate 40, illustrated schematically as a power transistor, to control the operation of a motor 42 used to actuate a trailer brake, as will be described. Each output 38 is controllable entirely independently of the other. Thus, the microprocessor 30 can independently control each brake of the trailer 12.

A third output from the microprocessor 30 is in the form of a display 44 provided for the operator of the vehicle 10 and preferably mounted in the cab, dashboard or other convenient location. The microprocessor 30 is preferably linked with the display 44 by a remote telemetry arrangement such as a radio link.

The motors 42 are preferably stepper motors able to operate control cables of the trailer brakes in order to apply the brakes. These are preferably arranged in such a manner as to supplement a conventional overrun trailer braking system which can therefore operate in a conventional manner in addition to operation of the arrangements of the invention.

The arrangements which have been described allow the microprocessor 30 to obtain data from the four transducers 24 and from the elevation and azimuth sensors 34,36 and to control trailer brakes through the outputs 38. The manner in which these facilities are used in accordance with the invention can now be described in more detail by explaining the operation of the system in various situations which will arise during use.

Trailer at Rest

When the trailer is at rest, the nose weight of the trailer will be applying a vertical force to the tow ball 14, causing the tow ball 14 to deflect relative to the mounting bracket 16 and apply corresponding forces to the transducers 24. This results in signals to the microprocessor 30 and these signals can, after calibration, be used to calculate the current deflection of the tow ball 14, and thus the nose weight of the trailer. This value is stored for future use.

The microprocessor 30 can transmit information to the display 44, such as the nose weight of the trailer on the vehicle.

Vehicle Moving Forward (Straight Line)

When the vehicle begins to move forward, the accelerometers 34,36 will sense the change. The microprocessor 30 can calculate the current speed of the vehicle 10 by repeatedly reading the sensors 34,36 and using the conventional velocity equation:

$$v_n = u_n + a_n t_n$$

where $v_n$ is the current vehicle velocity, $u_n$ is the velocity calculated by a previous calculation, $a_n$ is the acceleration reported by the sensors 34,36 and $t_n$ is the elapsed time between readings.

In addition to calculating the velocity in this manner, the microprocessor 30 can monitor the load applied to the vehicle 10 by the trailer 12, by reading the transducers 24. Consequently, two plots of the type shown in FIG. 5 can be notionally produced within the microprocessor 30.

Figure 5:
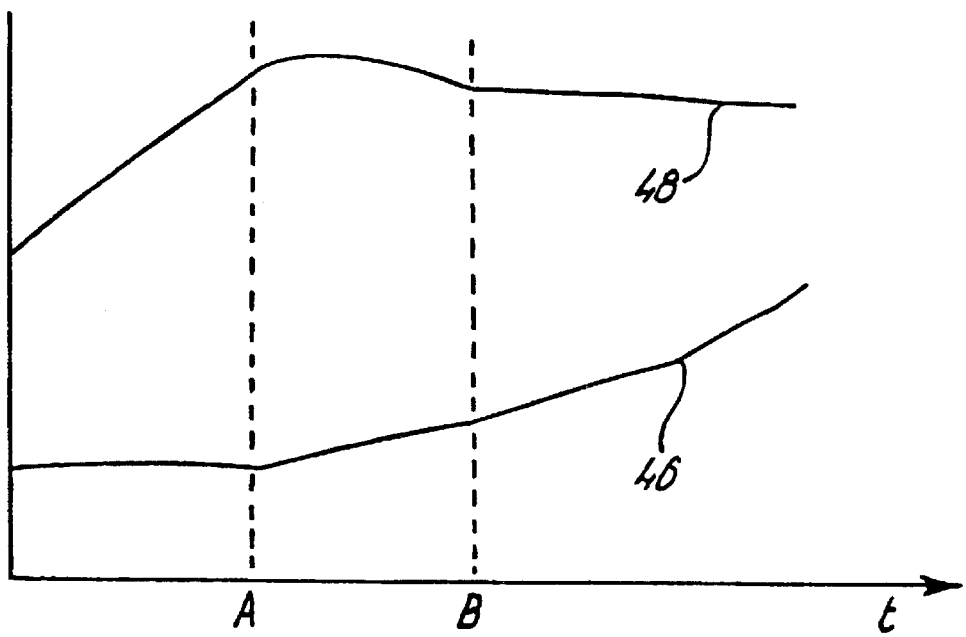
FIG. 5 illustrates the measurements made by the apparatus.

In FIG. 5, the horizontal axis indicates time elapsed. The lower plot 46 indicates the velocity in the forward direction measured by the sensors 34,36. The plot 48 represents the load applied to the bracket 16 by the tow ball 14. Initially, the load 48 will be increasing as the vehicle 10 seeks to move the trailer, by overcoming friction and the like. In due course, this resistance is overcome at point A and the trailer begins to accelerate. The load on the vehicle 10 begins to reduce and the trailer continues to accelerate with the vehicle 10. At point B, the trailer resistance has been fully overcome. At this point, the microprocessor 30 calculates and stores a reading for the resistive force exerted by the trailer on the vehicle 10, for future reference.

While the trailer continues in motion (as determined by the microprocessor 30 monitoring trailer velocity), the resistive force exerted by the trailer weight measured instantaneously and repeatedly by the microprocessor 30 is continuously compared with the initial stored value. The purpose of this is to determine whether the mean resistive force has dropped below the stored reference value. If so, this indicates that the vehicle 10 is not applying towing forces to the trailer 12, but the trailer 12 is either coasting behind the vehicle 10, or moving faster than the vehicle 10. In either case, the microprocessor 30 calculates whether the outputs 38 are to be activated to actuate the motors 40 in order to apply the trailer brakes. This will cause the trailer to slow down, which will result in an increase of the effective resistive force of the trailer perceived by the microprocessor 30. The trailer brakes continue to be used to slow down the trailer until the effective resistive force has reached or passed the stored reference value. At that point, the trailer is again under towing forces from the vehicle, and will be under safe control. Once the effective gross weight has exceeded the stored value, the trailer brakes are no longer actuated.

The recalculation is carried out frequently, preferably sufficiently frequently as to be, in effect, continuous, in comparison with the rate of change of the measured parameters.

It will be apparent that the algorithm used by the microprocessor 30 for controlling the activation of the brakes should incorporate hysteresis to avoid unnecessary operation and release of the brakes.

Figure 6:
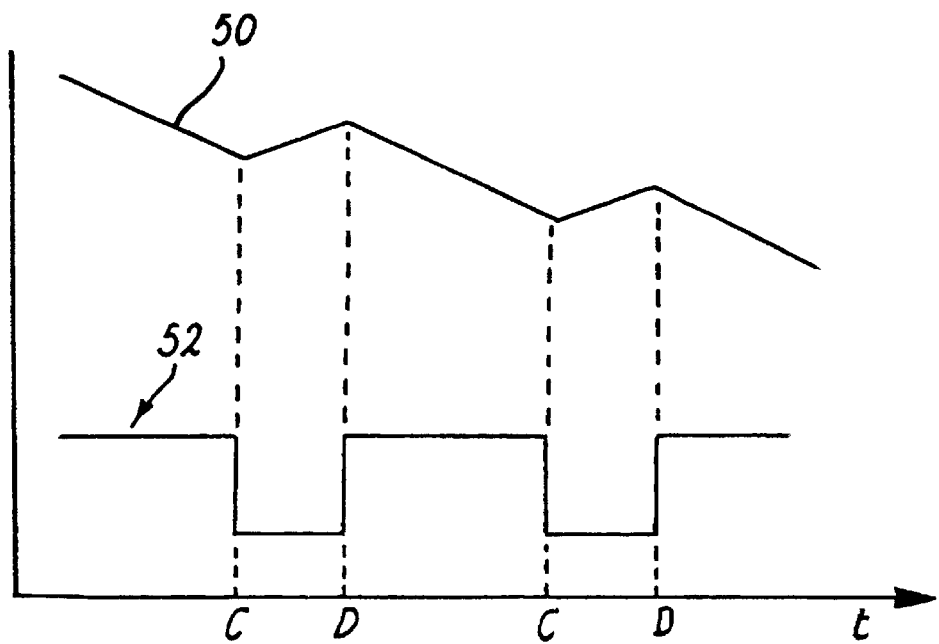
FIG. 6 illustrates the braking applied by the arrangement.

In addition, it is envisaged that the microprocessor 30 will not operate the trailer brakes continuously for longer than a predetermined time period, to ensure that trailer brakes do not become overheated, reducing braking efficiency. Thus, the microprocessor 30 will operate and release the brakes in a pulsed manner until resistive force exerted by the trailer has returned to a value at or above the stored value. The result can be illustrated diagrammatically as in FIG. 6. In FIG. 6, the horizontal axis represents time. The vertical axis is used to illustrate various parameters, as follows.

The trailer velocity is illustrated at 50 and is initially reducing because the brakes have been applied, as illustrated by the square wave 52 of which the higher value illustrates application of brakes, and the lower value indicates release of brakes. The velocity 50 continues to decrease until the brakes are released at C to allow the brakes to cool. The brakes remain released until D, when they are reapplied. Between the times C and D, the trailer velocity 50 will increase. When the brakes are re-applied, the velocity 50 again begins to reduce. Thus, the arrangement can steadily reduce the trailer velocity in this pulsed manner until an acceptably low trailer velocity is reached, causing the trailer to become under control of the vehicle 10 by virtue of towing forces being applied.

In addition it is envisaged that the microprocessor 30 will use the resistive force exerted by the trailer to calculate the towed mass M of the trailer itself, by using the conventional force equation:

$$F = M \times A$$

Where F is the force exerted by the trailer on vehicle 10, and A is the acceleration of vehicle 10 reported by sensors 34 and 36.

The microprocessor 30 can then transmit the calculated mass of the trailer to the display 44 via the output 38.

Moving Forward (Cornering)

Repeated application of the brakes in the manner described above could be dangerous while the vehicle is negotiating a corner. Braking the trailer in this situation could cause the trailer to step dangerously out of line with the vehicle 10 (moving sideways out of the corner). Cornering of the vehicle 10 can be sensed by the accelerometers 34,36 and reported to the microprocessor 30. While cornering is being reported, the microprocessor 30 ceases to attempt to align the trailer in a straight line behind the vehicle 10, allowing the trailer to be out of line by an amount appropriate to the speed and degree of cornering.

Moving Forward (Trailer Swaying)

The description above has indicated that each trailer brake can be individually operated by the microprocessor 30. In particular, it is desirable that the brakes on either side of the trailer can be operated separately, but may be operated individually or as a group. Consequently, if the microprocessor 30 determines (by reference to the outputs from the transducers 24 and sensors 34,36) that the trailer is swaying from side-to-side behind the vehicle 10 which is travelling in a straight line, the microprocessor 30 can produce appropriate outputs 38 to operate brakes on one side or the other of the trailer, intermittently, to bring the trailer back under control.

Reversing

The vehicle can be detected as reversing by reference either to the outputs of the accelerometers 34,36, or by reference to the perceived nose weight, which will steadily decrease as the vehicle continues to reverse. When the microprocessor 30 senses that the vehicle is reversing, no braking is applied by the system to the trailer.

It will thus be apparent from the above that the system allows the behaviour of the trailer to be monitored continuously, and modified when appropriate, to assist in achieving safe operation at all times. This monitoring and control takes place independently of the operation of the brakes by the vehicle operator, which can continue to operate in the normal manner. In particular, it is important to note that the trailer brakes may be applied by the system to control trailer behaviour, even while vehicle braking is not being instructed by the vehicle operator.

It will be apparent that very many variations and modifications can be made to the apparatus described above, without departing from the scope of the present invention. In particular, many different types of transducer and arrangements of transducer could be used, with appropriate adjustment of the algorithms for assessing trailer behaviour from their outputs. A microprocessor based arrangement is envisaged, in the interests of size, cost, programming simplicity and the like, but other circuit arrangements could be used.

Whilst endeavouring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

What is claimed is:

1. A vehicle trailer control system comprising sensor means operable to provide measurements of the forces between a towing vehicle and a trailer, control means operable while the towing vehicle is in operation and in response to signals received from the sensor means corresponding to the measurements to assess the behaviour of the trailer relative to the towing vehicle, the control means being further operable to apply braking to the trailer to modify the trailer behaviour independently of operation of the towing vehicle brakes by the operator whereby at least load axially applied to the towing vehicle by the trailer is assessed substantially continuously, and the control means thereby applies braking to substantially ensure that a towing force acts upon the trailer, wherein the system has accelerometer means, the accelerometer means providing signals to the control means for determining velocity and direction of travel of the towing vehicle, wherein braking is enabled and disabled in pulsed manner until a towing force is restored.

2. A system according to claim 1, wherein the sensor means provide information enabling the system to detect alignment of the trailer behind the towing vehicle.

3. A system according to claim 1, wherein the accelerometer means measure acceleration of the towing vehicle, and the control means derives the acceleration of the trailer from the measured acceleration and from the measurements of the sensor means.

4. A system according to claim 1 further comprising actuator means operable to apply control forces to a brake cable of the trailer.

5. A system according to claim 4, wherein the actuator means comprise at least one stepper motor.

6. A system according to claim 4, wherein the actuator means are operable to apply control forces independently to individual brake cables.

7. A vehicle trailer control system comprising sensor means operable to provide measurements of the forces between a towing vehicle and a trailer, control means operable while the towing vehicle is in operation and in response to signals received from the sensor means corresponding to the measurements to assess the behaviour of the trailer relative to the towing vehicle, the control means being further operable to apply braking to the trailer to modify the trailer behaviour independently of operation of the towing vehicle brakes by the operator whereby at least load axially applied to the towing vehicle by the trailer is assessed substantially continuously, and the control means thereby applies braking to substantially ensure that a towing force acts upon the trailer, wherein the system has accelerometer means, the accelerometer means providing signals to the control means for determining velocity and direction of travel of the towing vehicle, wherein the vehicle trailer control system is operable to apply braking selectively to one side of the trailer or the other to correct misalignment.

8. A system according to claim 7, wherein said accelerometer means is operable to provide information enabling the system to sense the towing vehicle turning.

9. A system according to claim 7, wherein the accelerometer means measure acceleration of the towing vehicle, and the control means derives the acceleration of the trailer from the measured acceleration and from the measurements of the sensor means.

10. A system according to claim 7 further comprising actuator means operable to apply control forces to a brake cable of the trailer.

11. A system according to claim 10, wherein the actuator means comprise at least one stepper motor.

12. A system according to claim 10, wherein the actuator means are operable to apply control forces independently to individual brake cables.

13. A vehicle trailer control system comprising sensor means operable to provide measurements of the forces between a towing vehicle and a trailer, control means operable while the towing vehicle is in operation and in response to signals received from the sensor means corresponding to the measurements to assess the behaviour of the trailer relative to the towing vehicle, the control means being further operable to apply braking to the trailer to modify the trailer behaviour independently of operation of the towing vehicle brakes by the operator whereby at least load axially applied to the towing vehicle by the trailer is assessed substantially continuously, and the control means thereby applies braking to substantially ensure that a towing force acts upon the trailer, wherein the system has accelerometer means, the accelerometer means providing signals to the control means for determining velocity and direction of travel of the towing vehicle, wherein said accelerometer means is operable to provide information enabling the system to sense the towing vehicle turning, and wherein the vehicle trailer control system refrains from applying, braking to the trailer while the towing vehicle is turning.

14. A system according to claim 13, wherein the trailer has a hitch point, and wherein the sensor means are arranged to sense forces in a mounting arrangement by which the hitch point is mounted on the towing vehicle.

15. A system according to claim 14, wherein the sensor means comprise transducer means, said transducer means being mounted to detect forces within a spacer member which, in use, is entrapped between the towing vehicle and the hitch point.

16. A system according to claim 15, wherein the transducer means comprise strain gauges.

17. A system according to claim 16, wherein the strain gauges are under compression when the vehicle trailer control system is at rest.

18. A system according to claim 15 wherein the transducer means comprise a plurality of transducers distributed around the spacer member.

19. A system according to claim 13, wherein the accelerometer means measure acceleration of the towing vehicle, and the control means derives the acceleration of the trailer from the measured acceleration and from the measurements of the sensor means.

20. A system according to claim 13 further comprising actuator means operable to apply control forces to a brake cable of the trailer.

21. A system according to claim 20, wherein the actuator means comprise at least one stepper motor.

22. A system according to claim 20, wherein the actuator means are operable to apply control forces independently to individual brake cables.

* * * * *